(12) United States Patent
Goulding

(10) Patent No.: US 8,706,298 B2
(45) Date of Patent: Apr. 22, 2014

(54) TEMPORAL TRACKING ROBOT CONTROL SYSTEM

(75) Inventor: John R. Goulding, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 410 days.

(21) Appl. No.: 12/725,740

(22) Filed: Mar. 17, 2010

(65) Prior Publication Data

US 2011/0231016 A1   Sep. 22, 2011

(51) Int. Cl.
*G05B 19/048* (2006.01)
*G05D 1/12* (2006.01)

(52) U.S. Cl.
USPC .............................. 700/251; 700/259; 901/1

(58) Field of Classification Search
USPC .................. 700/245–251, 254, 259; 901/1
See application file for complete search history.

(56) References Cited

U.S. PATENT DOCUMENTS

| | | | |
|---|---|---|---|
| 7,211,980 B1* | 5/2007 | Bruemmer et al. | 318/587 |
| 2005/0090933 A1* | 4/2005 | Ebert | 700/245 |
| 2005/0234679 A1* | 10/2005 | Karlsson | 702/181 |
| 2006/0015215 A1* | 1/2006 | Howard et al. | 700/245 |
| 2006/0241808 A1* | 10/2006 | Nakadai et al. | 700/245 |
| 2007/0027579 A1* | 2/2007 | Suzuki et al. | 700/245 |
| 2007/0080825 A1 | 4/2007 | Shiller | |
| 2008/0009969 A1* | 1/2008 | Bruemmer et al. | 700/245 |
| 2008/0009970 A1* | 1/2008 | Bruemmer | 700/245 |
| 2009/0234499 A1* | 9/2009 | Nielsen et al. | 700/250 |

OTHER PUBLICATIONS

Fulgenzi et al., "Probabilistic motion planning among moving obstacles following typical motion patterns", Intelligent Robots and Systems, Oct. 2009, pp. 4027-4033.
Philippsen et al., "Toward Online Probabilistic Path Replanning in Dynamic Environments", Intelligent Robots and Systems, Oct. 2006, pp. 2876-2881.
Jae-Woong Yi et al., "Estimation of Depth and 3D Motion Parameters of Moving Objects with Multiple Stereo Images by Using Kalman Filter", IEEE, vol. 2, Nov. 1995, pp. 1225-1230.
International Search Report and Written Opinion for International Application No. PCT/US2011/28468 dated Jul. 15, 2011.
Fiorini et al., "Motion Planning in Dynamic Environments Using the Relative Velocity Paradigm", International Journal of Robotics Research, 17(7), Jul. 1998, pp. 760-772.
"Swimming pool game 'Marco Polo' used to develop robot control", Duke Today, http://www.dukenews.duke.edu/2009/03/robots.html.

\* cited by examiner

*Primary Examiner* — Jason Holloway
(74) *Attorney, Agent, or Firm* — Renner, Otto, Boisselle & Sklar, LLP.

(57) ABSTRACT

A temporal controller for mobile robot path planning includes a sensor module for receiving data corresponding to spatial locations of at least one object, and a temporal control module operatively coupled to the sensor module, the temporal control module configured to predict future locations of the at least one object based on data received by the sensor module. The controller further includes a temporal simulation module operatively coupled to the temporal control module, wherein the temporal simulation module configured to use the predicted future locations of the at least one object to simulate multiple robot motion hypothesis for object avoidance and trajectory planning.

29 Claims, 6 Drawing Sheets

74 – T1 continues
76 – T1 associates with detection 1
78 – T1 associates with detection 2

TEMPORAL TRACKING ROBOT CONTROL SYSTEM

FIELD OF THE INVENTION

The present invention relates generally to tracking systems and, more particularly, to a robot tracking system that associates data, predicts the future location and state of sensed and a priori objects, aids in the classification of objects, and plans the future location and state of one or more robots using goal- or constraint-oriented and/or behavior-based models.

BACKGROUND

In 1986 the concept of a subsumption architecture for path planning and motion control of robots was developed. This concept provides a method for structuring motion from the bottom up using layered sets of rules. Later, the rules were represented as a network of probabilistic constraints linking the successive positions (poses) of a mobile robot. Currently, behavior-based approaches are practiced by a number of leading research institutions and companies, including MIT, Stanford, CMU, University of Arizona, Idaho National Labs and iRobot.

Further developments in path planning for obstacle avoidance were made by Paolo Fiorini and Dr. Zvi Shiller (P. Fiorini et al., International Journal of Robotics Research, 17(7): 760-772, July 1998). More particularly, Fiorini and Shiller developed an algorithm having decreased computational intensity (this was accomplished by forming the set RAV(ti) as a discrete grid). In accordance with the algorithm, a position of a node is determined based on an operator (e.g., velocity) that is multiplied by a chosen time interval. The position reached at the end of each maneuver is the successor of the function nj(ti). Further, the position of the node is determined for every operator in RAV such that a node is completely expanded when all operators obi in RAV(j) have been applied. By assigning an appropriate cost to each branch that the node may traverse, an appropriate objective function can be maximized/minimized to calculate trajectory.

SUMMARY OF INVENTION

While the above methods provide means for estimating the motion of an object, they do not disclose a dual-loop temporal tracking system algorithm that can associate sensed and a priori data, dynamically accept and respond to strings of temporal-based human operator commands, and/or predict the future locations, states and their covariance of tracked objects and robots. The algorithm in accordance with the present invention may use probabilistic object-to-object and robot-to-object modeling and simulation, use the predictions to aid in the classification of the objects, and produce temporal-based action commands for one or more robots and/or feedback to a human operator interface, all in the presence of missing data, latency, translational bias, and/or sensing error.

A device and method in accordance with the present invention simulates multiple robot motion hypotheses for obstacle avoidance, trajectory and state planning. The simulation "time-propagates" all tracked objects (e.g., from sensor data), a priori map data, and the robot in a common robot-centric representation. More particularly, to enable a second temporal simulation loop, one or more new tracks may be added that can simulate object motion, duplicate the tracked objects, introduce one or more models to generate action hypothesis for the robots and objects, and introduce a probabilistic scoring method to optimize strings of action hypothesis over time.

A "track" is an association of a single or multiple sensed, common attributes or features of an object fundamentally comprising location, state and their covariance, but is typically combined with other identifying, discriminating and classifying attributes or characteristics such as length, width, color, temperature, function, object type, and so on. The term "state" as used herein refers to position, velocity, acceleration, heading or trajectory and their covariance of objects and robots, but moreover to other controllable aspects, features, or sub-components of objects and robots, such as airframe role, pitch and yaw with kinetic and potential energy, walking robot joint angles with system center of gravity/pressure, gravitational and inertial forces, temperature (e.g., hot/cold), color, behavior (e.g., angry/hostile, offensive, exploring, tracking, defensive, etc.), pose (e.g., orientation/heading, one body segment with respect to another, e.g., camera pointing, gun turret aiming), posture (e.g., relaxed, recoiled, walking stance, reaching arm, etc.), and so on. The term "state", also applies to secondary devices and effects (e.g., arm, water cannon, gun, etc.) or local/global environmental conditions and effects, such as wind, noises (e.g., explosions, horns, etc.), RF/microwave fields, biohazards and so on. A "model" is a Kalman filter, goal- or constraint-oriented equation or algorithm, behavior-based rules, heuristics, one or more routes on a human operator map interface, method for coordinating multiple, interactive robots (e.g., searching a room with unknown objects), and the like.

According to one aspect of the invention, a temporal controller includes: a sensor module for receiving data corresponding to the location and state of at least one object; a temporal control module operatively coupled to said sensor module, the temporal control module configured to predict future locations and states and their covariance of the at least one object in three-dimensional space based on data received by the sensor module; a temporal simulation module operatively coupled to said temporal control module, the temporal simulation module configured to use the predicted future locations and states and their covariance of the at least one object to simulate multiple robot motion hypothesis for object avoidance and trajectory and state planning.

According to one aspect of the invention, the temporal simulation module is configured to time-propagate locations and states and their covariance of the at least one object based on the received data corresponding to spatial locations and states and their covariance, a priori map data, and locations and states and their covariance of the at least one robot in a common robot-centric representation.

According to one aspect of the invention, the controller further includes a track module operatively coupled between the sensor module and the temporal control module, the track module configured to analyze data received by the sensor module and associate the data into tracks produced by the at least one object.

According to one aspect of the invention, the temporal simulation module is configured to further use the tracks and the predicted locations and states and their covariance of the at least one object to simulate actions taken by the at least one object in response to the at least one robot actions.

According to one aspect of the invention, each track includes data corresponding to at least one of location and state and their covariance.

According to one aspect of the invention, the temporal control module is configured to use the tracks to predict future locations and states and their covariance of the at least one object.

According to one aspect of the invention, the controller further includes a storage and maintenance module operatively coupled to the track module, the storage and maintenance module configured to delete tracks based on expected or probable state.

According to one aspect of the invention, the controller further includes a scoring module operatively coupled to the temporal control module, the scoring module configured to provide a ranking indicative of a likelihood that the at least one object or robot will occupy each predicted locations with a predicted state and their respective covariance.

According to one aspect of the invention, the scoring module is further configured to provide a ranking indicative of a likelihood that the at least one object or robot will follow a path through two or more predicted locations with predicted states and their respective covariance.

According to one aspect of the invention, the controller further includes a memory, wherein the ranking is stored in the memory and associated with each predicted object, robot, location, and/or state.

According to one aspect of the invention, the temporal simulation module is configured to predict actions of the at least one object based on the location and state and their covariance of the at least one robot using one or more models.

According to one aspect of the invention, the temporal simulation module is configured to predict actions of the at least one robot based on the location and state and their covariance of the at least one object using one or more models.

According to one aspect of the invention, the temporal simulation module is configured to predict actions of the at least one object based on the location and state and their covariance of the at least one object using one or more models.

According to one aspect of the invention, the temporal simulation module is configured to predict actions of the at least one robot based on the location and state and their covariance of the at least one robot using a model.

According to one aspect of the invention, the controller further includes a scoring module operatively coupled to the temporal simulation loop, the scoring module configured to provide one or more rankings per object indicative of a likelihood that the at least one object will act as predicted for the one or more models per object.

According to one aspect of the invention, the controller further includes a scoring module operatively coupled to the temporal simulation loop, the scoring module configured to compare the predicted location and state and their covariance of the one or more objects with the sensed and a priori data to provide one or more rankings per object indicative of a likelihood that the at least one object is of at least one class, type, and/or context of the said objects given the one or more models per object.

According to one aspect of the invention, the temporal simulation module is configured to simulate the multiple robot motion hypotheses from a robot-centric point of view.

According to one aspect of the invention, the temporal simulation module is further configured to dynamically accept and respond to strings of temporal-based human operator commands to simulate at least one desired robot motion hypotheses from an operator-centric point of view.

According to one aspect of the invention, the temporal control module includes one or more models, the temporal control module configured to use the models to predict future locations and states and their covariance of the at least one object and the at least one robot.

According to one aspect of the invention, the temporal simulation module executes asynchronously from the temporal control module.

According to one aspect of the invention, the temporal simulation module further includes a storage device for storing the predicted future locations and states and their covariance.

According to one aspect of the invention, the temporal simulation module further includes an operator interface device (e.g., a display and touch screen) to dynamically accept and respond to strings of temporal-based human operator commands.

According to one aspect of the invention, the temporal simulation module further includes an operator interface device (e.g., a display and touch screen) to show the predicted future locations and states and their covariance of the sensed and a priori objects and the at least one robot to a human operator/observer.

According to one aspect of the invention, the temporal simulation module further includes a communication interface device to receive said present and/or predicted locations and states and their covariance and said scores of the at least one object and the at least one robot from other sensing and control-related components of the at least one remote sensing device.

According to one aspect of the invention, the temporal simulation module further includes a communication interface device to receive said present and/or predicted locations and states and their covariance, said scores, said models and/or said scoring methods of/for the at least one object and the at least one robot from other sensing and control-related components of the at least one said robot such that all robots and control-related devices may operate in common and/or coordinated fashion.

According to one aspect of the invention, the temporal simulation module further includes a communication interface device to send said action commands to the at least one said robot and/or control-related components.

According to one aspect of the invention, the temporal simulation module further includes a communication interface device to send said action hypothesis, present and/or predicted locations and states and their covariance, said scores, said models and/or said scoring methods of/for the at least one object and the at least one robot to the at least one robot and control-related devices such that all robots and control-related devices may operate in common and/or coordinated fashion.

According to one aspect of the invention, the temporal simulation loop is configured to use a one or more models to generate multiple action hypotheses for the at least one object and the at least one robot.

According to one aspect of the invention, the temporal control module is configured to operate in a sensor-centric reference frame.

According to one aspect of the invention, a method for simulating multiple robot motion hypotheses for obstacle avoidance and trajectory planning includes: receiving data corresponding to the location and state of at least one object; predicting future locations and states and their covariance of the at least one object in three-dimensional space based on data received by the sensor module; using the predicted future locations of the at least one object to simulate multiple robot motion hypothesis for object avoidance and trajectory planning.

According to one aspect of the invention, the method further includes time-propagating locations and states and their covariance of the at least one object based on the received data corresponding to spatial locations and states, a priori map data, and a location and state of the at least one robot in a common robot-centric representation.

According to one aspect of the invention, the method further includes associating the sensed data into tracks produced by the at least one object.

According to one aspect of the invention, the method further includes using the tracks and the predicted locations and states and their covariance of the at least one object to simulate actions taken by the at least one object in response to the at least one predicted robot actions.

According to one aspect of the invention, each track includes data corresponding to at least one of location and state and their covariance.

According to one aspect of the invention, the method further includes using the tracks to predict future locations and states and their covariance of the at least one object.

According to one aspect of the invention, the method further includes tracks based on expected or probable trajectory and motion control.

According to one aspect of the invention, the method further includes providing a ranking indicative of a likelihood that the at least one object or robot will occupy each predicted locations with a predicted state and their respective covariance.

According to one aspect of the invention, the method further includes providing a ranking indicative of a likelihood that the at least one object will follow a path through two or more predicted locations with a predicted state and their respective covariance.

According to one aspect of the invention, the method further includes predicting actions of the at least one object based on the location and state and their covariance of the at least one robot.

According to one aspect of the invention, the method further includes providing a ranking indicative of a likelihood that the at least one object will act as predicted.

According to one aspect of the invention, simulating multiple robot motion hypothesis includes simulating the multiple robot motion hypotheses from a robot-centric point of view.

According to one aspect of the invention, the method further includes using a behavior model to generate multiple action hypotheses for the robot.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

Figure 1:
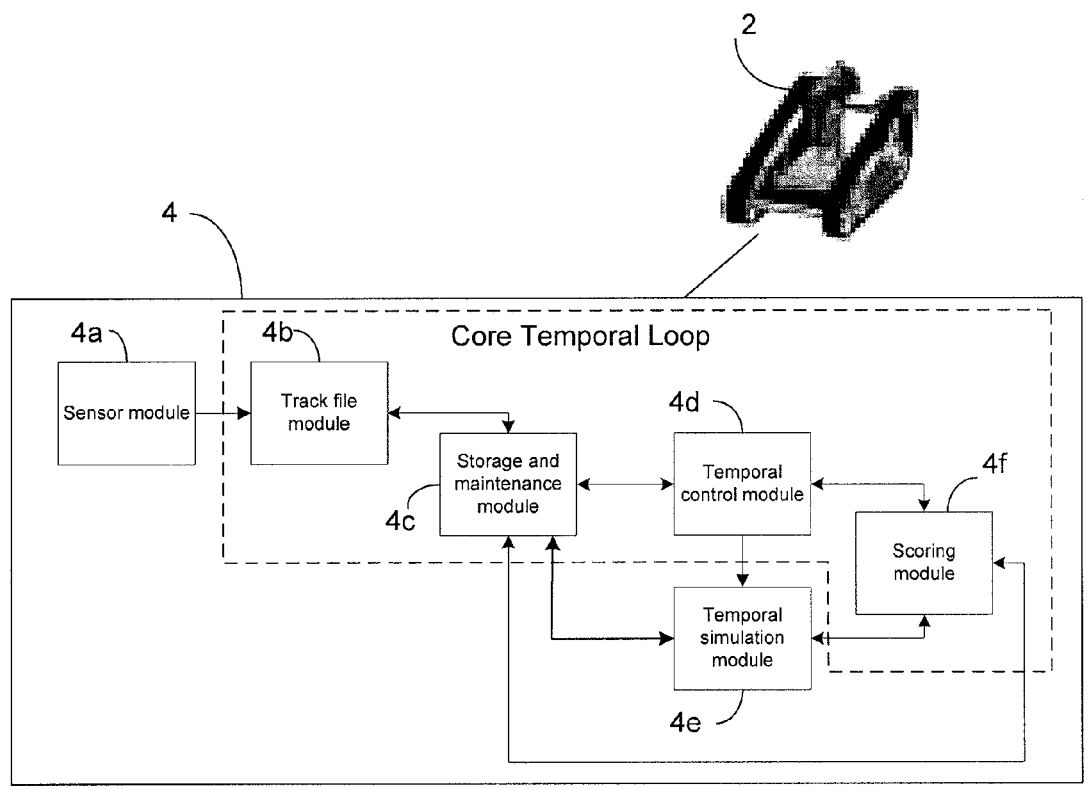
FIG. 1 is a block diagram illustrating exemplary modules that can be used to implement the functions of the temporal controller in accordance with the present invention.

The principles of the invention will now be described with reference to the drawings, wherein like reference numerals refer to like elements throughout.

A device and method in accordance with the present invention can associate sensed and a priori data, dynamically accept and respond to strings of temporal-based human operator commands, predict the future positions, states and their covariance of tracked objects and robots using probabilistic object-to-object and robot-to-object modeling and simulation. The device and method can use the predictions to aid in the classification of the objects, and produce strings of temporal-based action commands for mobile path planning trajectories, motion control, and the like of one or more robots and/or provide feedback to a human operator interface, all in the presence of missing data, latency, translational bias, and/or sensing error An obstacle (also referred to as an object) as used herein refers to any fixed, movable or moving obstacle, including barriers such as walls, living beings such as humans or animals, and inanimate devices such as robots, vehicles, etc. Additionally, the device and method in accordance with the present invention are described with respect to conventional mobile robot path planning trajectories and motion control. However, the scope of the device and method in accordance with the present invention encompasses the "state" of the robot. The term "state" as used herein refers to position, velocity, acceleration, heading and their covariance of an object, temperature (e.g., hot/cold), color, behavior (angry/hostile, offensive, exploring, tracking, defensive, etc.), pose (orientation/heading, one body segment with respect to another, e.g., camera pointing, gun turret aiming), and posture (relaxed, recoiled, walking stance, reaching arm, etc.). The term "state", in addition to the robot, also can be applied to secondary devices, such as horns, water cannon, RF/microwave, gun, etc. For example, the state of a flying robot (air or submarine) may comprise potential and kinematic energy (elevation) and its pose such as buoyancy with respect to multiple body segments, and so on. The state of a walking robot, for example, may encompass dynamic forces acting on the center of gravity of a single or multi-segmented body with respect to the center of pressure of the feet when executing a turn. For example, walking robots may need to temporally predict the future state of not only the body but the legs and feet with respect to some predicted future action such as executing a turn where the center of gravity can be outside the center of pressure. As another example, a robot may want to reach for a moving object. The act of reaching changes the center of mass and is thus part of the trajectory solution and comprises a state that would need to be temporally predicted. In another example, an object may be sensed flying toward a ground-based robot, e.g., someone throwing a rock or other object at a ground robot. The state (position, velocity, heading, and covariance) of the rock or object may cause the robot to change its state (path or pose, such as extending an arm to shield a camera). Further, the term "state" may encompass various secondary devices, such as the sounding of a horn to motivate bird objects in the trajectory of the robot, and so on.

In accordance with the invention, a temporal core loop generates track files that predict future positions, states and their covariance of objects. The track files from the core loop are provided to a temporal simulation loop (which can run asynchronously with respect to the core loop) to simulate multiple robot motion hypothesis for obstacle avoidance, trajectory planning, and state (orientation, posture, sound horn, etc.) planning. The simulation is time-propagated for all tracked objects (from sensor data), a priori map data, and the robot in a common robot-centric representation. In addition to track files generated by the core sensory loop, a new track file is added to simulate the robot, duplicate the track files from the core loop to enable the temporal simulation loop introduce behaviors to generate action hypothesis for the robot, and provide probabilistic scoring method to optimize strings of action and state hypothesis over time.

In accordance with the present invention, a number of steps are implemented to predict motion of an object, including one or more of: a) collecting sensor data; b) associating the collected sensor data into sets of observations; c) predicting the future position, state and their covariance of tracked objects based on past positions, states, and covariances; d) predicting multiple hypothesis of the future positions, states and their covariances of objects using goal- or constraint-oriented and behavioral models; e) estimating beliefs about the state of the objects; and f) comparing the predicted states with the sensory data to aid in the classification of objects. Additionally, using the predicted motion of an object, simulations are run to predict actions taken by the object in response to robot actions (e.g., will the object change its course due to the robot heading to intercept the object?) that also aids in the classification of objects.

FIG. 1 illustrates an exemplary robot 2 that includes a temporal controller 4 in accordance with the present invention. The temporal controller 4 includes a number of modules that implement the various functions performed by the temporal controller 4. As used herein, a module refers to hardware and/or software used to implement a specified function. The hardware and/or software used by each module may be dedicated to that module, or some or all of the hardware and/or software may be shared between modules. Preferably, the modules are implemented via software instructions stored in a non-volatile storage device (e.g., EPROM, flash RAM, PROM, etc.) and executed as a multi-process, multi-threaded code by a processing device (e.g., a central processing unit, two or more distributed central processing devices, field programmable gate array (PGA), etc.).

The temporal controller 4 includes a sensor module 4a operatively coupled to one or more spatial sensors (not shown). Via the sensor module, spatial data concerning locations of various objects can be collected and provided to the temporal controller 4. The sensor data may be collected, for example, using any conventional spatial sensor, wherein the collected data corresponds to at least one of position, velocity, heading, acceleration, etc. of the sensed object. The sensor covariance or measurement uncertainty may come from the sensor or it may be assumed and/or computed over multiple sensed data. Examples of such sensors include camera-based systems (mono or stereo), RADAR, LIDAR, or other sensors that collect spatial data in real time.

The data collected by the sensor module 4a is provided to a track file module 4b, which analyzes the data and associates it into sets of observations, called tracks, that are produced by the same object (tracks can include data corresponding to position, velocity, acceleration, heading, etc.).

In associating the data to tracks, data is processed, clustered or segmented into objects, and an object is associated to a track using a goodness of fit metric(s) that compares at least one of position, velocity, heading, pose, color, temperature, behavior, etc. of the object with the expected state of the track (position, velocity, heading, pose, color, temperature, behavior, etc.) propagated to the time the data is observed. Note the track is forward- or back-propagated (i.e., as in the position with respect to a given velocity over time) to the sensor collection or observation time. If the object and track are similar (e.g., they occupy the same position, have the same velocity and heading, exhibit the same pose, are the same color and temperature, etc.), the data is used to update the track. A track is a collection of one or more sensor observations in time, with attributes (position, velocity, heading, pose, color, temperature, behavior, etc.) typically stored in a database. The sensed data along with any known or hypothesized data (e.g., classification attributes of the object from association with the track) about the object is added to the track at the time the data was observed. The objective of updating the track is to add current sensory data to improve the predicted future position and state estimate and reduce the covariance or uncertainty. In the case of multiple objects, the object that best matches the track may be associated and the remaining objects discarded or form new tracks. If the object and track are only somewhat similar (e.g., at least one of but not all of position, velocity, heading, pose, color, temperature, behavior, etc. are similar, as in most commonly object-to-track occupancy), the objects may form new tracks or form multiple hypothesis on the existing track or both. If the object and track are dissimilar or no track exists, a new track is started.

Figure 2:
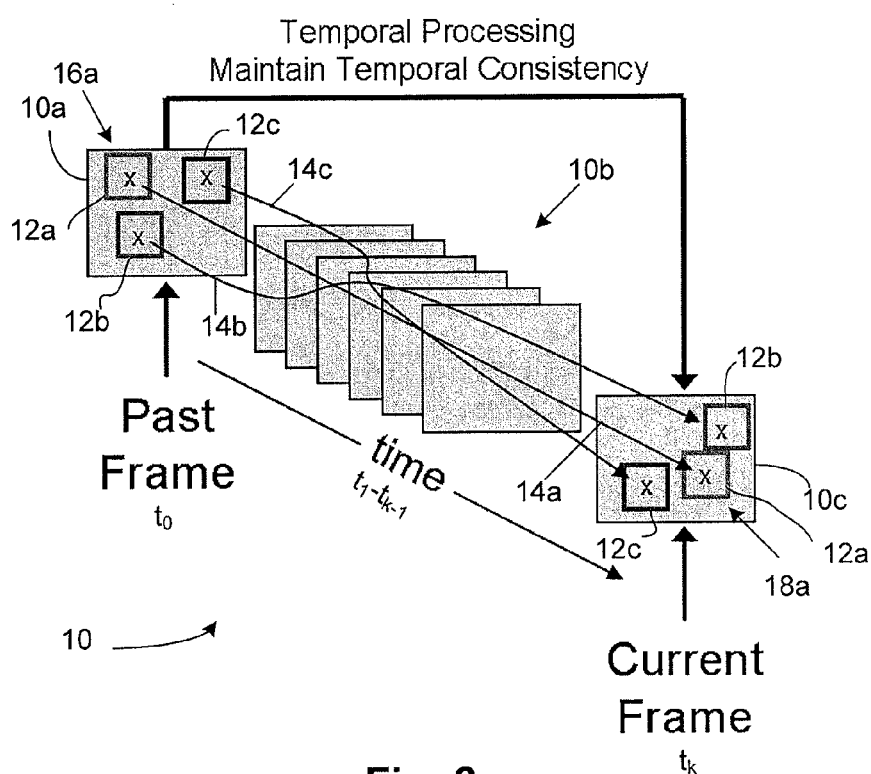
FIG. 2 is a schematic diagram illustrating temporal processing of object locations.

For example, and briefly referring to FIG. 2, there is shown a number of frames 10 that span a period of time t, wherein each frame represents a sensor collection period (e.g., a sample period in which sensor data has been collected and recorded). A first frame 10a illustrates position data (as determined from the collected sensor data) for objects 12a, 12b and 12c at a point in time $t_0$, intermediate frames 10b represent position data for objects 12a, 12b and 12c during $t_1$ to $t_{k-1}$, and a final frame 10c represents position data for objects 12a, 12b and 12c at the present point in time $t_k$. The data corresponding to each object 12a, 12b and 12c in each frame is then associated together to form a path (track) of the object over the time period $t_0$-$t_k$, which is represented in FIG. 2 by lines 14a, 14b and 14c and correspond to objects 12a, 12b and 12c, respectively. Thus, for example, the track of object 12a includes information corresponding to position, velocity, acceleration, and/or heading over time (e.g., the object starts at location 16a at time $t_0$, ends at location 18a at time $t_k$, and during times $t_1 t_{k-1}$ moves along path 14a at a static or variable velocity). Further details with respect to sensor data to track association, initiating, updating, and deleting tracks can be found, for example, in "Design and Analysis of Modern Tracking Systems" (1999) by Samuel Blackman and Robert Popoli, "Multitarget-multisensor tracking: Principles and techniques" (1995) by Yaakov Bar-Shalom, the contents of which is incorporated herein by reference.

Moving back to FIG. 1, data corresponding to each track file is stored in a storage device, such as system memory. Storage, retrieval and/or maintenance of the track files to/from the storage device is performed by a storage and maintenance module 4c. More particularly, the storage and maintenance module 4c manages the files stored in memory of the temporal controller 4, which includes writing the data to memory, retrieving data from memory, and purging data from memory that is no longer relevant. Purging data can be based on "scores" associated with the data as described in more detail below.

A temporal control module 4d uses the stored track file data to predict future locations of the tracked object. More particularly, once the data is associated into tracks, the future state of the object can be predicted based on the past behavior (position, velocity, acceleration, covariance, etc.) of the respective objects. This can be accomplished, for example, using the straight-line motion equation from physics, and is of the form $$x_{t+1} = x_t + \dot{x}_t \Delta t + \ddot{x}_t \Delta t$$

where $x_{t+1}$ is the estimated position at time t plus the incremental time $\Delta t$, $x_t$ is the starting position, $x_t$-dot is the velocity over $\Delta t$, and $x_t$-double-dot is the acceleration over $\Delta t$. In the case where velocity and/or acceleration vary and/or other states, such as the object aspect, temperature, etc., are tracked features (sometimes referred to as feature-aided tracking) and/or the measurement uncertainty or covariance is required, a Kalman filter or the like may be used. A Kalman filter is a recursive filter that estimates the state and covariance of a linear dynamic system from a series of measurements. In the case where complex motion must be predicted (e.g., serpentine motion from a person), a behavior-based motion model may be used. Behavior-based systems input current and expected object position and states plus environmental attributes (e.g., distance to another object, distance to robot, etc.) in a multiple, hierarchical rules and equations model of the object (e.g., animal, person, vehicle, robot, etc.) and are capable of estimating emergent behavior. Kalman filters, particle filters, behavior-based systems, and the like are well known by those having ordinary skill in the art and, therefore, will not be described herein.

Figure 3:
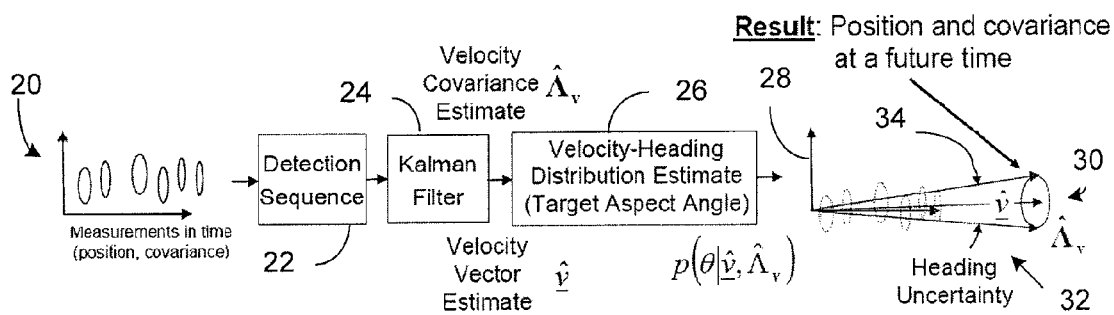
FIG. 3 is a block diagram illustrating temporal processing of sensor data to obtain position and covariance at a future time.

Referring briefly to FIG. 3, the functions implemented by the sensor module 4a, track file module 4b and temporal control module 4d are shown as a process flow diagram. As noted above, to implement temporal processing one or more sensor data or cues (position, velocity, acceleration, covariance, etc.), Kalman filtering of the detection sequence in time, and estimation of a future (or past) state using one or more motion models (straight line, curved, go-stop-go, etc.) is/are utilized. Graph 20 in FIG. 3 illustrates the collection of sensor data, for example, using RADAR. As is well known, RADAR provides an accurate measurement for range of an object, but not for cross range. Hence, the data in the graph 20 is shown as a series of ellipses, wherein locations along the x-axis are known with a higher degree of certainty than locations along the y-axis. At block 22, the sensor data is provided to a detection sequence, wherein the sensor data collected over a time period is used to generate track files for objects detected by the sensors. Input of the sensor data to block 22 may be accomplished via any one of a number of known techniques, such as via a digital communication link, or if the data is in analog form, via an analog-to-digital conversion circuitry.

At block 24, the data detection sequences (tracks) are filtered using a Kalman filter, which has the effect of smoothing the center points of the data shown in graph 20. The Kalman filter outputs estimates of velocity covariance and vector covariance, and this data is provided to block 26, which uses the data to estimate velocity-heading distributions for the object (e.g., to predict position and covariance at a future time). In estimating velocity-heading distributions for the object, the target aspect angle can be thought of as a probabilistic distribution of the target heading based on the velocity and its covariance. Preferably, the probability of the position of the object is calculated, and the best path is determined as the path that has the lowest probability of intersecting N objects. Uncertainties in the velocity-heading distribution can be expressed as a conical function as shown in graph 28, wherein the most likely estimate is along the center 30 of the cone 32, and the uncertainties extending to the outer edges 34 of the cone 32. As can be appreciated, the further out in time the position is estimated, the larger the uncertainties become.

It is noted that data from different sensors or different types of sensors may be combined or "fused" at the track-level so as to improve overall sensor measurements. For example, and as noted above, RADAR has good accuracy with respect to range, but accuracy falls off with respect to cross range. Similarly, IIR (imaging infrared) systems have excellent cross range accuracy, but accuracy falls off with respect to range. So, when sensory data from RADAR and sensory data from IIR associate with a common track, it is an opportunity to improve the accuracy of spatial measurements. The range data from the RADAR system and cross range data from the IIR system can be "fused" so as to obtain accuracy with respect to both range and cross range. This fused data can be stored in a database as described below for use by the control system. Another example of sensor data that may be fused is IIR data and multispectral or "color" data.

Figure 4:
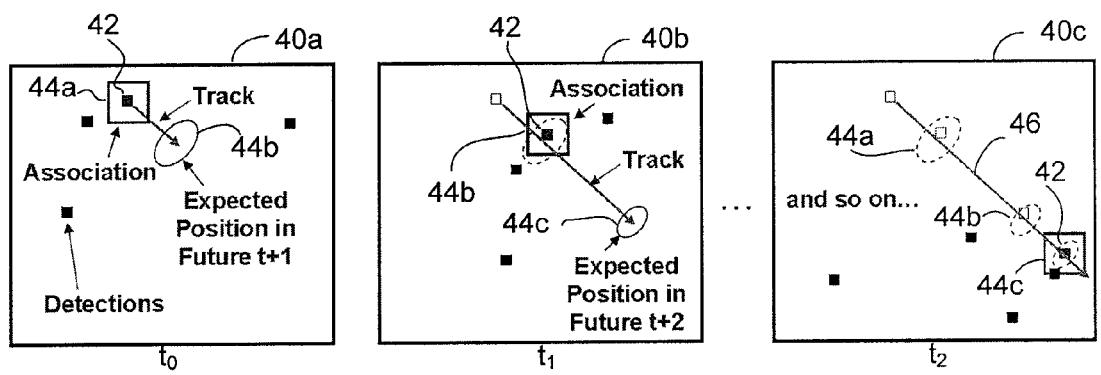
FIG. 4 is a schematic diagram illustrating temporal processing of object locations.

FIG. 4 illustrates how temporal processing as described above "strings" the detections along in time. For example, a first frame 40a in FIG. 4 corresponds to time $t_0$, wherein object 42 is at location 44a (the large red box indicating the sensor data is associated with the track) and, at some time in the future ($t_1$), the object 42 is predicted to be in location 44b (e.g., the predicted location can be based on the track file, as determined above in conjunction with Kalman filtering as noted above, and denoted by the ellipse to indicate a spatial uncertainty area). A second frame 40b corresponds to time $t_1$, wherein object 42 is at location 44b at time $t_1$, and, at some time in the future ($t_2$) is predicted to be at location 44c. This process may be repeated as shown in the third frame 40c to illustrate future predicted locations of the object, wherein the line 46 connecting the locations as shown in frame 40c represents the path (track) of the object 42. Multiple object tracking (MOT) of static targets also may be used to remove platform motion and isolate to target motion, which allows for filtering and prediction. While static targets do not have a velocity component, there may be measurement uncertainties for static targets, and tracking a static target can minimize measurement uncertainties (e.g., by averaging the detected position of the static target).

Moving back to FIG. 1, a temporal simulation module 4e uses the track data files as created by the track file module 4b and the predicted locations of the object as made by the temporal control module 4d to simulate actions taken by the objects in response to certain robot actions. For example, if an object "O" is moving in a particular direction and expected to be at location "A" at time "t", then a simulation may be run to predict the action of the object "O" due to the robot 2 moving toward location "A" at time "t" in any one of a number of different trajectories (e.g., directly moving to location "A" in a straight line, moving to location "A" in based on serpentine behavior, etc.). The results of these simulations can be used by the controller 4 to determine which action the robot 2 will take. Further details with respect to the simulations are provided below with respect to FIG. 7.

With continued reference to FIG. 1, beliefs about the predicted state of the object (e.g., kinematic covariance, classification, and relationships or likelihoods between objects and their cures) can be estimated over time. In other words, a level of confidence can be associated with the each predicted state for each object (including both predicted locations of the object and responses of the object based on robot actions). Such beliefs can be implemented by a scoring module 4f, wherein each predicted location and/or object response is assigned a weighting factor corresponding to how likely the object will actually occupy the predicted location and/or how likely the object will actually react to actions taken by the robot 2. Paths taken by the object (both paths taken by the object without robot intervention and paths taken by the object in response to robot intervention) can be analyzed. Those paths having the highest score can be considered the most likely path of the object, while those with the lowest scores can be considered to be the least likely path of the object. The scores for each location and path can be stored in memory by the storage and maintenance module 4c. Further, the scores can be used by the storage and maintenance module 4c to determine which data should be purged from memory.

Figure 5:
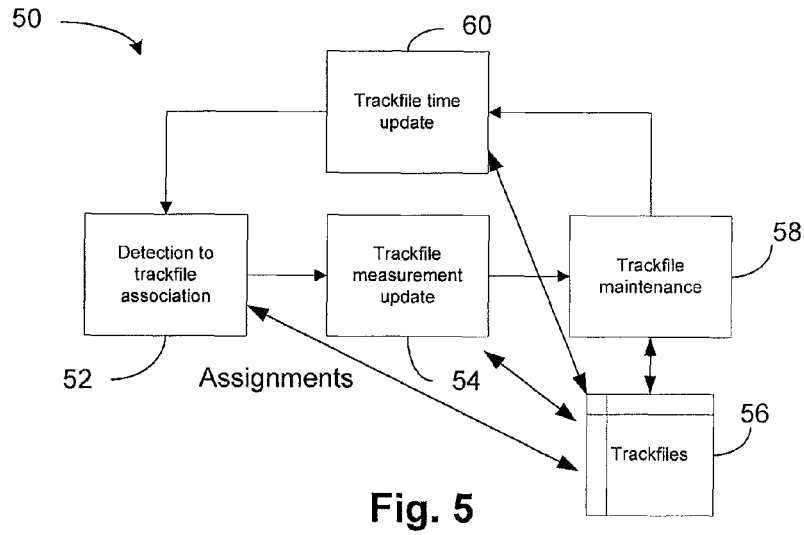
FIG. 5 is a block diagram illustrating exemplary steps for temporal processing of sensor data to create track files in accordance with the present invention.

There are three temporal loops that share the common database 56 (the database is discussed below with respect to FIG. 5). The core temporal loop 50 (also referred to as a temporal sensor loop and shown in FIGS. 5 and 7) is defined as the temporal loop that operates on real-time sensed data. It is independent of the velocity or rate of change of state of the objects being sensed. Rather, the throughput with which the loop cycles is intrinsically tied to the data collection rate, and the track time update is the time between successive data collections. The temporal simulation loop 90 (FIG. 7) is defined as the temporal loop that simulates or time propagates multiple-hypothesis tracks (both sensor-based and robot) into the future. The number of cycles or the total propagation time is independent of both the sensed data and robot control temporal loops. Preferably, the temporal simulation loop 90 operates as fast as possible to simulate as far into the future as possible. The depth and complexity of the multi-hypothesis temporal simulation is constrained by the throughput of the computer hardware, required temporal length, time interval and accuracy of robot action commands, and the temporal sensor loop 50 update rate and the sensed robot feedback rate, both of which can cause recalculation of part or all of the simulation. The temporal control loop 102 (FIG. 7) is defined as the block that executes all or a portion of the simulated robot(s), as temporal string(s) of action commands. Typically, such action commands are sent to and executed in real-time by a motion control subsystem that minimizes the mean square error between the commanded action and the real-time sensed robot or robot component. The motion control subsystem may feed back the sensed robot position, state and covariance measurements to the temporal simulation loop 90 and/or the robot or robot component (both defined as objects) may be sensed by the temporal sensor loop 50. Moving now to FIG. 5, there is shown an exemplary core temporal loop in accordance with the present invention. The core temporal loop 50 provides steps for determining future locations of objects and beliefs that the objects will actually occupy the predicted locations (e.g., the core temporal loop 50 can use at least some functionality provided by the sensor module 4a, track file module 4b, the storage and maintenance module 4c, the temporal control module 4d, and relevant portions of the scoring module 4f). Beginning at block 52, the core temporal loop 50 inputs sensor data corresponding to object position, state and their covariance, and associates the sensor data with the at least one track, as previously described.

Next at block 54, a track measurement update is performed, wherein the sensor-based position, state, and their covariance are used to update the estimated position, state, and their covariance for each associated track. For example and as previously described, the current position, velocity, acceleration, etc. of an object as provided by the most recent sensor data is used to update the associated track corresponding to the object. If a track does not yet exist for the object or multiple track hypotheses are desired, then a new track can be created using the sensor data and/or a combination of sensor and track data. The new or updated track then is stored in a track file database 56, for example, for use at a later time as discussed below.

It is noted that while a single "central" database is shown in the figures and described herein, it is contemplated that multiple databases may be used to store data, and these databases may be distributed throughout the system. For example, an exemplary control system may include multiple sub-systems (e.g., multiple distributed sensor collection systems), wherein the sub-systems each have their own database. Data corresponding to sub-system "A" may be stored in database "A", which is local to sub-system "A" (e.g., database "A" is located in the general vicinity of sub-system "A"). Further, data corresponding to sub-system "B" may be stored in database "B", which is local to sub-system "B". Data from each of database "A" and database "B" then may be used within the context of the present invention.

At block 58, maintenance is performed on the tracks. As will be appreciated, sensor measurement uncertainty and multi-hypothesis motion and state models associated with or applied to each predicted track can spawn multiple tracks, resulting in the number of tracks growing exponentially. To minimize memory use and reduce processing load, tracks in which the object is unlikely to follow are eliminated. A "score" or cost-based metric can be used to rate and rank the quality of tracks. For example, tracks that associate and persist over multiple sensor observations in time are maintained, while tracks that are no longer supported by sensor data, beliefs or tracks outside a field of regard are deleted. Scoring methods can range from very simple threshold counters to complex rule and equation systems.

During the initial execution of block 58, maintenance may be very minimal, or not performed at all (e.g., the collected and/or generated data is sufficiently small not to warrant maintenance operations). However, and as described in more detail below, each location of the object can spawn a number of predicted locations, and the number of predicted locations can grow exponentially resulting large amounts of data. Maintenance is performed on this data to eliminate predictions that are unlikely and/or simply not supported by sensor data, and as will be described later, the device and method in accordance with the present invention use scores from the probabilistic object-to-object and robot-to-object modeling and robot-centric simulation to aid in sensor-based track maintenance.

For example, and as described below with respect to block 60, a weighting factor can be assigned to each predicted location. Then, the likelihood that the object will take a particular path through a location can be computed by summing the weighting factor for each location within the path. Predicted paths with scores higher than other predicted paths (and the locations that define the path) are retained in the database 56, while paths with scores lower than other predicted paths (and the locations that define the path) can be eliminated.

Determination of whether or not maintenance is performed can be based on various factors. For example, the amount of memory consumed by the data can be used to determine whether or not maintenance should be performed. If the required memory exceeds the predetermined threshold, then maintenance is performed (e.g., track files not supported by the data can be purged). Alternatively, maintenance may be performed each time block 58 is executed.

Once track file maintenance has been performed, a track file time update is implemented at block 60. More specifically, future track states and beliefs are predicted for the next sensor observation time. For example, the expected location, state and their covariance of the object at the time the next sensor reading is taken can be predicted based on the current track file. As described herein, the predicted future locations of the object can be generated using a Kalman filter as discussed above with respect to FIG. 3. Then, from the predicted locations, subsequent locations, states and their covariance also can be predicted. This process can continue as far into the future as desired. However, the further in to the future the predictions are made, the less accurate or more uncertain (higher covariance) they become.

To address uncertainties in predicted locations, beliefs on the level of certainty for each predicted location of the object can be estimated based on the current and past sensor data. These beliefs can be stored in the database and associated with their respective track files. For example, based on the most recent sensor data, the likelihood that the object will be located at each previously predicted location is evaluated and a weight factor assigned to each predicted location. Once the predicted locations are evaluated, each possible path that the object may follow (e.g., the locations through which the object will pass) can be given a score. The weight factor for each location in the path can be summed together to provide an overall score for the path, thereby providing an indication of whether or not the path is supported by the sensor data. If the path is supported by the sensor data, it validates the motion model used (as in a multi-hypothesis test) and aids in the classification of objects. Once an object is classified, its location, state and their covariance may be predicted with more computational efficiency.

Figure 6:
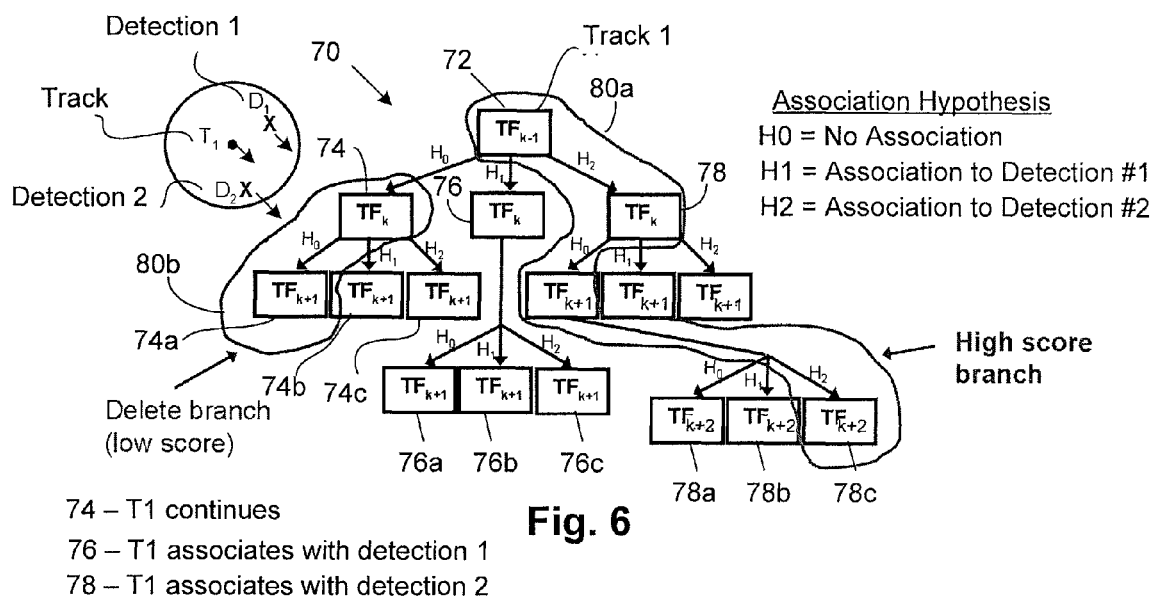
FIG. 6 is a chart illustrating exemplary scoring of track files in accordance with the present invention.

For example, when a detection-to-track file association is ambiguous (i.e., when the sampled data does not support or discredit the predicted position), decisions regarding the position can be delayed under the assumption that future data will resolve the ambiguity. This is referred to as multiple hypothesis tracking, or MHT. Referring briefly to FIG. 6, there is shown a tree 70 of possible locations of an object over a period of time, wherein at time k−1, the object is at a known location 72 (note the single-file example shows exponential growth in the number of track files). Prior to the next sensor update, there may be uncertainty regarding the object's next location (during subsequent time intervals, the object may continue on a current track, or associate with a new tracks based on various data) and, as a result, the loop may predict that at time k the object may be at one of a number of locations 74 (T1 continues), 76 (T1 associates with detection #1), or 78 (T1 associates with detection #2). Still before receiving the next sensor update, the loop may predict the location of the object at the next time increment k+1. Since there is uncertainty of the location at time k (e.g., the object may be at location 74, 76 or 78), the temporal loop predicts the location at time k+1 for each of the locations 74, 76 and 78 at time k (e.g., locations 74a, 74b, 74c, 76a, 76b, 76c and 78a, 78b and 78c). At time k, the temporal loop receives a sensor update, and then compares the sensor data to the predicted locations of the object. More particularly, each predicted location can be given a score based on how close the predicted location corresponds to the sensed data. For example, locations that highly correspond to the sensor data can be scored as $H_2$, locations that moderately correspond to the sensor data can be scored as $H_1$, and locations that do not correspond to the sensor data can be scored as $H_0$. In assigning a score to locations, a "cost" can be computed, wherein the association cost is Gaussian and expressed as a probability or likelihood of the goodness fit. Equation 6.6 in Blackman & Popoli is of the form $$\frac{(Vc)e^{(-0.5d^2)}}{(\sqrt{|S|})(2pi)^{(M/2)}}$$

where $d^2$ is the normalized statistical distance between measured detection and estimated track position defined in terms of the measurement residual vector, y and covariance matrix $S(d^2=y'(S^{(-1)})y)$, Vc is the measurement volume element, M is the measurement dimension, and $|S|$ is the determinant of the measurement residual covariance (HPH'+R) (this is the Blackman & Popoli goodness of fit equation mentioned above). A score of each predicted path then can be determined from the score assigned to each position that forms the path (e.g., a path 80a comprising $H_2$, $H_1$ and $H_2$ can be said to have a score of 5, while a path 80b comprising $H_2$, $H_0$ and $H_1$ can be said to have a score of 3). These scores then can used to evaluate which paths are more or less likely to be followed by the object, and thus to determine which paths and/or locations are purged from the database 56 during trackfile maintenance 58.

Upon completing block 60, the loop moves back to block 52 and repeats. Execution of the loop 50 continues to provide accurate data regarding future locations of the object.

In addition to the core temporal loop 50, the device and method in accordance with the present invention also includes a temporal simulation loop that simulates multiple robot motion hypothesis for obstacle avoidance and trajectory planning. To simulate multiple robot hypotheses, the simulation is time-propagated for all tracked objects (from sensor data), a priori map data, and the robot in a common robot-centric representation. In particular, a new track file is added to simulate the robot, duplicate the other track files to enable a second temporal simulation loop, introduce behaviors to generate action hypothesis for the robot, and provide probabilistic scoring method to optimize strings of action hypothesis over time.

Figure 7:
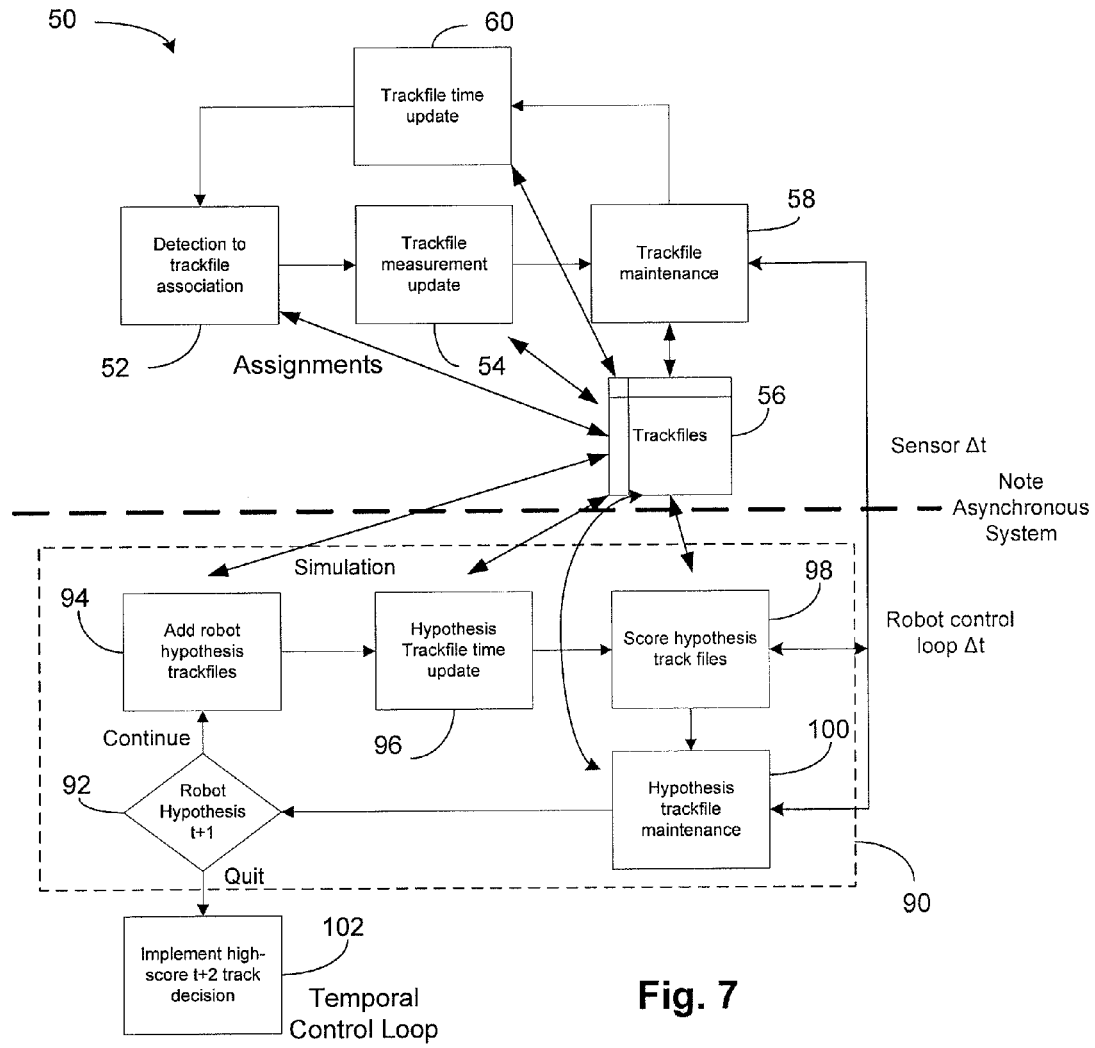
FIG. 7 is a block diagram illustrating exemplary steps for implementing a temporal simulation loop in accordance with the present invention.

Referring now to FIG. 7, there is shown an exemplary temporal simulation loop 90 in accordance with the present invention, wherein data from the core temporal loop 50 is provided to the simulation loop 90 as described in more detail below. The temporal simulation loop 90 is implemented from a robot-centric view (e.g., data is analyzed from the point of view of the robot) as opposed to the sensor centric view of the core temporal loop 50, and can use at least some functionality provided by the track file module 4b, the storage and maintenance module 4c, the temporal simulation module 4e, and relevant portions of the scoring module 4f.

Preferably, the temporal simulation loop 90 is executed asynchronously relative to the core temporal loop 50 (the core temporal loop 50 and the temporal simulation loop 90 may be viewed as independent systems that interact through one or more common databases (trackfiles 56)). This enables the temporal simulation loop 90 to execute at a much higher rate than the core loop 50, as the simulation loop 90 is not tied to update intervals associated with data collection and/or I/O devices (e.g., the core temporal loop 50 is tied collecting real sensor information, which in digital systems typically occurs at fixed intervals; the simulation loop is not tied to data collection and therefore can execute at higher rates). Thus, multiple robot-centric hypothesis planning may be performed by the simulation loop 90 during a single scan of the core temporal loop 50. To improve throughput, only the tracks modified by sensor data need be updated. Because more object-to-object and robot-to-object modeling and robot-centric simulations can be performed between trackfile maintenance 58 intervals, this has the benefit of improving (by depth of analysis or simulation, i.e., the number of temporal iterations of simulation loop 90) the aforementioned track rating and ranking scores used for sensor-based track deletion which then improves the quality or certainty of remaining tracks and thus computational efficiency of subsequent simulations.

The temporal simulation loop 90 begins at block 92 and, as noted above, implements a robot-centric perspective (the loop 90 analyzes data from the perspective of the robot) within the existing sensor-based track environment from database 56, by adding one or more robot track(s) given the current position, state and their covariance of each robot to be controlled. Further, block 92 may also receive positions, states and their covariance of object(s) and robot(s) as communicated from other temporal tracking control system (e.g., another robot) and other sensing and control-related components (e.g., distributed database(s) 56), such that all robots and control-related devices may operate in common and/or coordinated fashion. Further, initial hypothesis regarding how the robot can move and change state within its space are used. For example, the robot can change parameters that affect its position, such as acceleration, velocity, heading or any other parameter that may affect the robot's position and state in a future time period. For example, a gliding aerial robot control strategy is to conserve potential energy, and this requirement constrains or limits the possible controllable options (later hypothesis) to suppress diving maneuvers. However, it is envisioned that if the robot is "stuck" after testing all non-diving maneuvers, the constraint may be relaxed. For another example, a ground-based robot can honk its horn to affect one or more objects, such as birds. Further, a priori map data (that may or may not be associated with sensed-data track(s)) can be used to determine positions that may or may not be occupied by the object track(s) and/or the robot track(s). For example, a wall or body of water (track) may define an area that cannot be occupied by the robot track, steep inclines may define areas that are difficult to occupy or cannot be traversed at high speeds, large items that may be used as barriers by the object, etc. Further, the robot track(s), initial motion hypothesis, a priori map data, and motion models may be received from another temporal tracking control system (e.g., another robot) and/or from other distributed sensing and control-related components, such that all robots and control-related devices may operate in common and/or coordinated fashion. Further, initial hypothesis regarding how the at least one robot can move and change state within its space may come from an operator interface device (e.g., a display and touch screen) to dynamically accept and respond to strings of temporal-based human operator commands. Based on robot parameters, a priori map data, communicated data, and/or the operator temporal commands, probabilistic hypothesis can be made regarding the robot and/or object position, state and their covariance at a future time period, and these probabilistic hypotheses (as tracks) can be made as far into the future as desired, but with increasing uncertainty.

Once the top-level or supervisory control strategy or objective or path planning goal is determined, the individual robot track(s) may be simulated within the robot space determined at block 94, e.g., the one or more robot track files are hypothesized using the sensor-based track files from database 56 of the core temporal loop 50. More specifically, the track files corresponding to the position of objects with respect to time (including future predicted positions) as determined in the core temporal loop 50 are translated into the robot-centric view. In this manner, the temporal simulation loop 90 is made aware of the past, present and expected (future) positions of objects and object-to-object interaction hypothesis, wherein the positions are translated into robot space. The track files generated by the core temporal loop 50 can be retrieved from the database 56, or directly from the track file maintenance block 58 of the core temporal loop 50, or instantiated within the database 56.

Next at block 96, the track files are temporally updated. Because the sensor-based tracks are updated by physical measurement of the environment (i.e., truth) in loop 50, various hypotheses that may have developed from previous iteration(s) of loop 90 must be time-synchronized. More specifically in addition to computing the future position, state and their covariance of the hypothesized robot tracks, block 96 also computes the probable robot-to-object interaction and subsequent object-to-object interaction by spawning new object hypothesis tracks, if such object tracks do not already exist. In other words, a second simulation iteration (similar to block 54) is performed to predict the actions of the object(s) due to robot intervention and a third simulation iteration (similar to block 54) is performed to predict the actions of the object(s) due to object reaction to robot intervention. The positions of objects (including future positions) as determined by the core temporal loop 50 (which are sensor-based detections translated into robot space at block 94) are combined with various actions of the robot to simulate how the object may react to each robot action. The predictions are based on robot position within the robot space and expected behavior of the object or objects (e.g., the position of objects, including future positions of the objects relative to the robot, robot posture, sounds, etc.). Such new robot-to-object and object-to-object hypotheses track(s) are then recorded in the at least one trackfile database 56 to improve sensor detection-to-track association and aid in the classification of objects, as previously described. Further, such new robot-to-object and object-to-object hypotheses track(s) may be communicated to other temporal tracking control system (e.g., another robot) and other control-related components (i.e., distributed database(s) 56), such that all robots and control-related devices may operate in common and/or coordinated fashion. Further, the predicted future positions and states and their covariance of object(s) is also sent to the operator interface device (e.g., a display and touch screen) to show a human operator/observer.

For example, in a hostile scenario involving the robot and a terrorist, as the robot takes a particular action (e.g., engages the terrorist), the terrorist can be expected to take counter actions. This may involve a retreat from the robot toward a known barrier, wherein the retreat path may take a particular route (e.g., a straight line to the barrier or a zig-zag path toward the barrier, etc.). This expected counter action toward the barrier and the robot's further motion can be taken into account during the track file time update to predict the future position of the object (terrorist) relative to various future positions of the robot.

Figure 8:
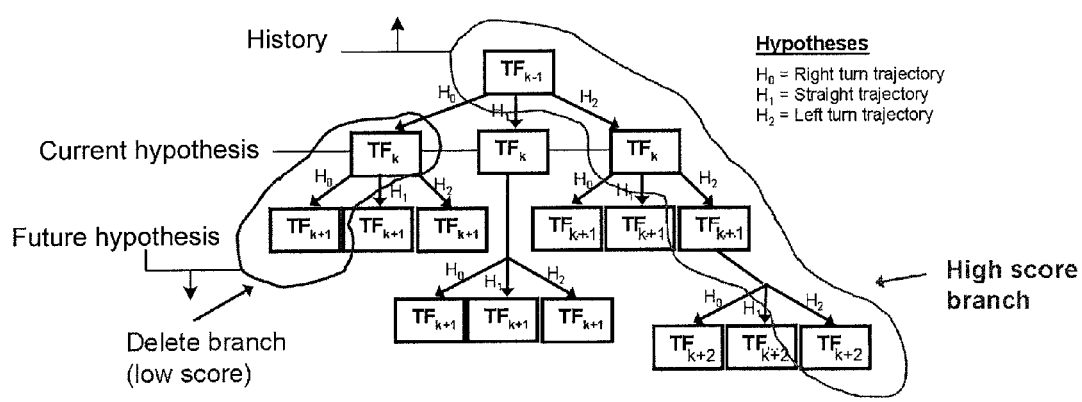
FIG. 8 is a chart showing illustrating exemplary scoring of hypothesis track files in accordance with the present invention.

Next at block 98, the hypothesis track files are scored. In a temporal sense, the new data is associated and scored. More specifically, each predicted future position of the object is scored based on the likelihood that the object will actually occupy the position given the sensed data and its hypothesized future position. Further, scores may be received by communication from other temporal tracking control system (e.g., another robot) and other control-related components (e.g., distributed database(s) 56), such that all robots and control-related devices may operate in common and/or coordinated fashion. Scoring can be implemented as described herein with respect to FIG. 6, and shown in the context of "multiple hypotheses planning" in FIG. 8, wherein each track file (path) is provided with a score corresponding to the likelihood that the object will occupy the predicted position. However, instead of the predictions being data driven (i.e., based on sensor data), the scoring is hypothesis driven based on the robot-centric view. For example, instead of the predicted positions being based on track file derived from sensor data explained above, the track files are based on actions (or inactions) made by the robot. Such actions may include the robot moving to the right, moving straight ahead, moving to the left, or taking no action at all. These actions can alter the score, for example, by increasing or decreasing the distance to targets. For example, the score may be calculated based on the line-of-sight (LOS) distance between the robot track and an object track, given such actions.

Each predicted position of the object comprises a possible path (a track) that inherits history from previous portions of the path (e.g., the score of the previous predicted position forms part of the history of the subsequent predicted position). This history forms the basis for scoring each path, wherein paths scoring the highest can be considered the most probable path of the object. At a desired path planning look-ahead time or state, the high scoring path is selected as the optimal path. For the above LOS scoring example, the control objective may be to minimize the LOS distance to one or more objects over the entire path history, wherein a pair-wise comparison of paths is made. The robot-to-object and object-to-object scores are then recorded in the at least one trackfile database 56 to improve sensor detection-to-track association and aid in the classification of objects, as previously described. Further, scores may be communicated to other temporal tracking control system (e.g., another robot) and other control-related components (i.e., distributed database(s) 56), such that all robots and control-related devices may operate in common and/or coordinated fashion.

At block 100, hypothesis track file maintenance is performed. Maintenance of the hypothesis track files may be implemented as described above with respect to the track files of the core loop 50. For example, based on the score for each path, it can be determined which path or paths are not supported by the hypothesis. These paths then can be discarded, and the remaining hypothesis track files can be stored in memory. In addition, the depth of the simulation (i.e., the number of times the robot, robot-to-object, and object-to-object hypothesis are estimated into the future) may be temporally "pruned back" based on interaction with sensor-based trackfile maintenance 58 to time-align the robot hypothesis for new sensor-based track data, performed in blocks 92, 94 and 96. This is indicated by lines connecting trackfile maintenance 58, score hypothesis track 98, and hypothesis track-file maintenance 100.

The entire process then moves back to block 92 and repeats using the latest sensor-based data. Future moves may be calculated as far into the future as possible until an object makes a move that causes many scenarios to be recomputed. The "pull" from the motion system to change its state is the factor that freezes and implements the best action. Since the tracks take into account object motion and robot motion from the perspective of the robot, an accurate future map of the environment as seen by the robot is obtained. The best action for the robot(s) or component(s) being controlled is then sent to the motion control system. Further, the best temporal string of action(s) may be communicated to other temporal tracking control system (e.g., another robot) and other control-related components (e.g., distributed database(s) 56), such that all robots and control-related devices may operate in common and/or coordinated fashion. Further, the top N temporal string of action(s) (i.e., predicted future positions and states and their covariance) for the robot(s) or component(s) being controlled is then sent to the operator interface device (e.g., a display and touch screen) to show the predicted future positions and states and their covariance of the robot(s) and/or controlled component(s) to a human operator/observer.

Although the temporal core loop and temporal simulation loop are described in conjunction with Kalman filters, other means of predicting future positions may be employed. For example, a behavior-based motion model may be used in place of the Kalman filter. Such behavior-based motion model can better predict the path of chaotic and erratic behavior common in "terrorist" driving and close-quarters combat. Behavior-based systems (e.g., subsumption architectures used to control unmanned ground vehicles) go beyond conventional motion models to enable emergent behavior. A hybrid implementation, such as an independent multiple model (IMM) or multiple hypothesis tracking (MHT) system, would enable the behavior algorithm to "select" the motion model to use (straight, curved, stop-go, etc.). Behavior, unlike a velocity vector and its covariance, takes additional factors into account. For example, a car with Ackerman steering cannot move sideways and, therefore, a piecewise-linear algorithm may be used to model its behavior. A person, on the other hand, can move sideways and a probabilistic model would incorporate some probability distribution to this sideways motion.

Behavior-based motion models would enable complex, emergent patterns, such as probabilistic prediction of serpentine target motion. Once serpentine motion by the object is likely, a behavior-based hypothesis would introduce a second likely path for MHT analysis. Behavior based models would also enable probabilistic prediction of goal-oriented target motion (e.g., a terrorist heading for a barrier) and aid in the classification of objects. Given a priori goal map data, a behavior-based hypothesis would compute a goal-based trajectory for analysis. Behavior/Goal oriented motion can be used to determine a likely path that the object will take. Thus, there is less uncertainty of the person moving sideways, for example, and this has a positive benefit on deleting paths with low scores, following paths with higher scores, and in correlating the simulated robot-to-object and object-to-object tracks with sensed data to aid in the classification of objects.

Additionally, tracking of objects may be enhanced using a number of different techniques. One method of enhancement may be via an occupancy grid, which defines the robot space as a number of rows and columns.

Figure 9:
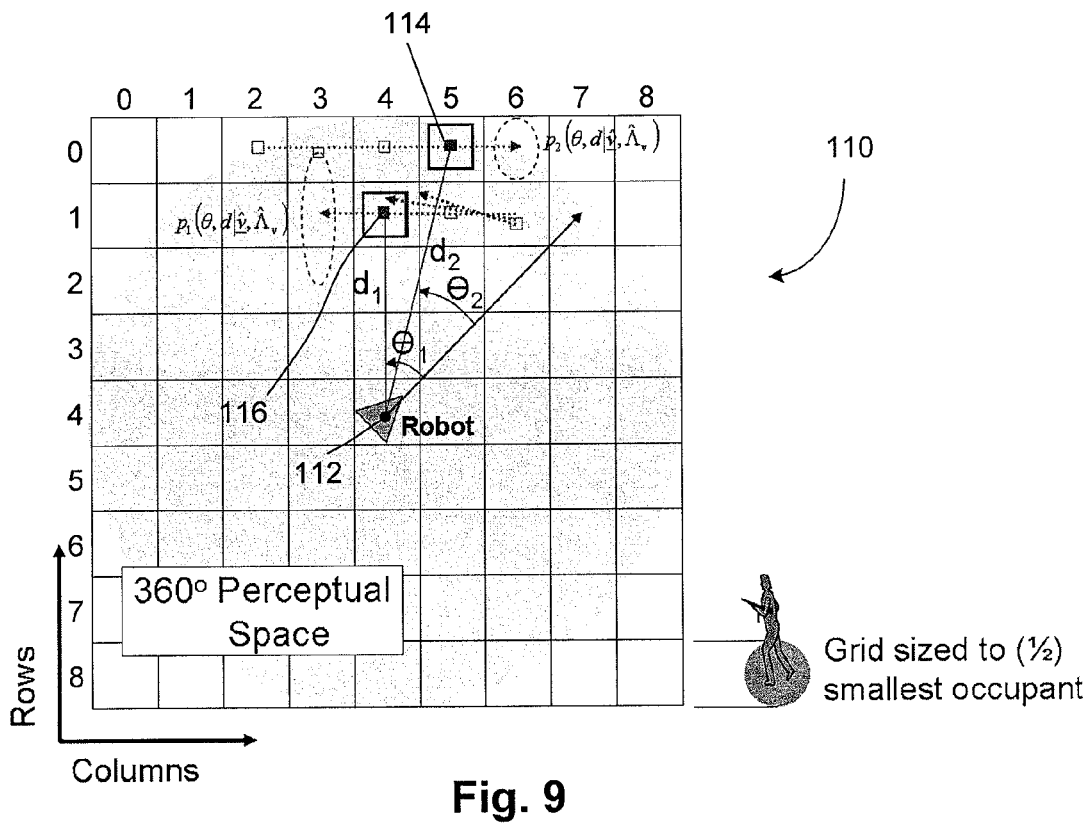
FIG. 9 illustrates an exemplary occupancy grid that defines robot space as a number of rows and columns.

Preferably, each cell of the grid is sized to one-half of the smallest occupant. FIG. 9 illustrates an exemplary occupancy grid 110, wherein a robot 112 is located in cell (4, 4). A first object 114, which previously occupied cells (0, 2), (0, 3) and (0, 4), is currently in cell (0, 5). Further, first object 114 is predicted to be in cell (0, 6) at some time in the future. Similarly, a second object 116, which previously occupied cells (1, 6) and (1, 5), is currently in cell (1, 4). Due to uncertainties, second object 116 is predicted to be in any one of cells (0, 3), (1, 3) or (2, 3) at some time in the future (represented by the ellipse spanning three cells).

An occupancy grid is advantageous in that it enables the geometric relationship between the robot and the tracked objects to be easily ascertained. Further, the occupancy grid requires a fixed memory size and, therefore, the memory required by the system can be readily determined. This representation is advantageous in alternative processing architectures, such as the graphical processing unit (GPU), where a plurality of cell processors operate simultaneously on the occupancy grid. For example, the temporal update of blocks 60 and 96 may be performed by GPU with scatter-gather capability.

Figure 10:
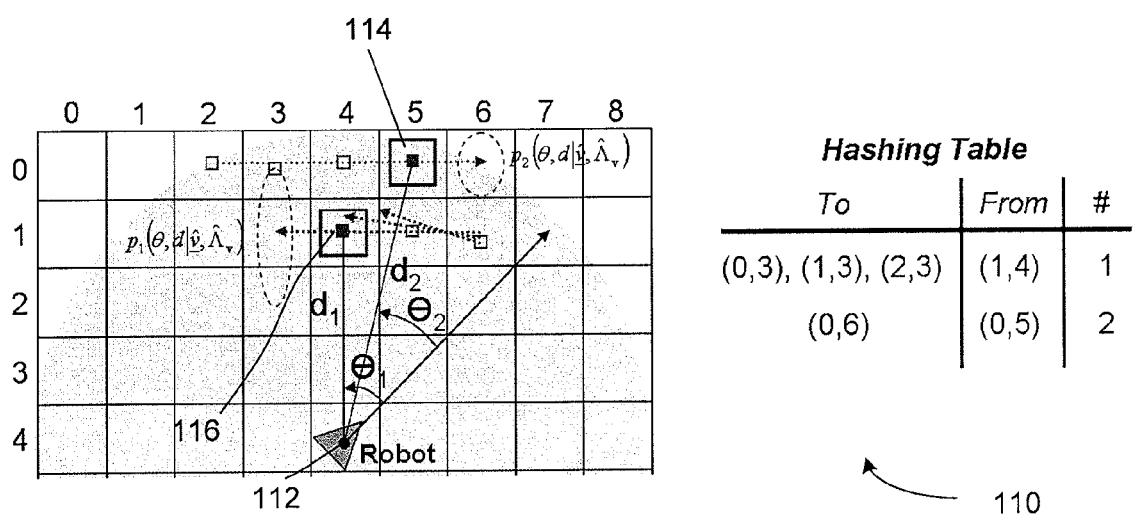
FIG. 10 illustrates an exemplary hashing table that can be used to keep track of object and robot position.

Another option for tracking objects may be to implement a hashing table. FIG. 10 illustrates an exemplary hashing table 120 that may be used to keep track of object and robot position. A hashing table is a type of reverse lookup table that associates the expected future position, belief, likelihood, etc. to the past observation. In the example shown in FIG. 10, the observation at cell (1,4) for track 1 would create three entries in the hashing table pointing to cells (0,3), (1,3) and (2,3) for the future position at time t+1. At time t+1, an observation at any of the aforementioned coordinates would be associated with the track 1 pointer. Hashing tables are shown to be faster than linked lists for large number tracks.

To make use of the aforementioned device and method, it is noted that some form of simultaneous location and mapping, called SLAM, can be utilized in mobile robots to increase accuracy and mitigate sensor drift over time. For example, it is well known in the robotics industry that wheel slip leads to encoder errors and thus position errors over time. A constellation algorithm, which compares multiple data points, such as the center points of objects, between two or more sensor observation times to determine the difference in state of the measuring device, can be used to compensate for platform position measurement error and to isolate target motion, allowing for filtering and prediction in multiple object tracking systems. This method works well for ground applications where multiple detections of static targets are common, and may be considered a "GPS denied" solution.

Figure 11:
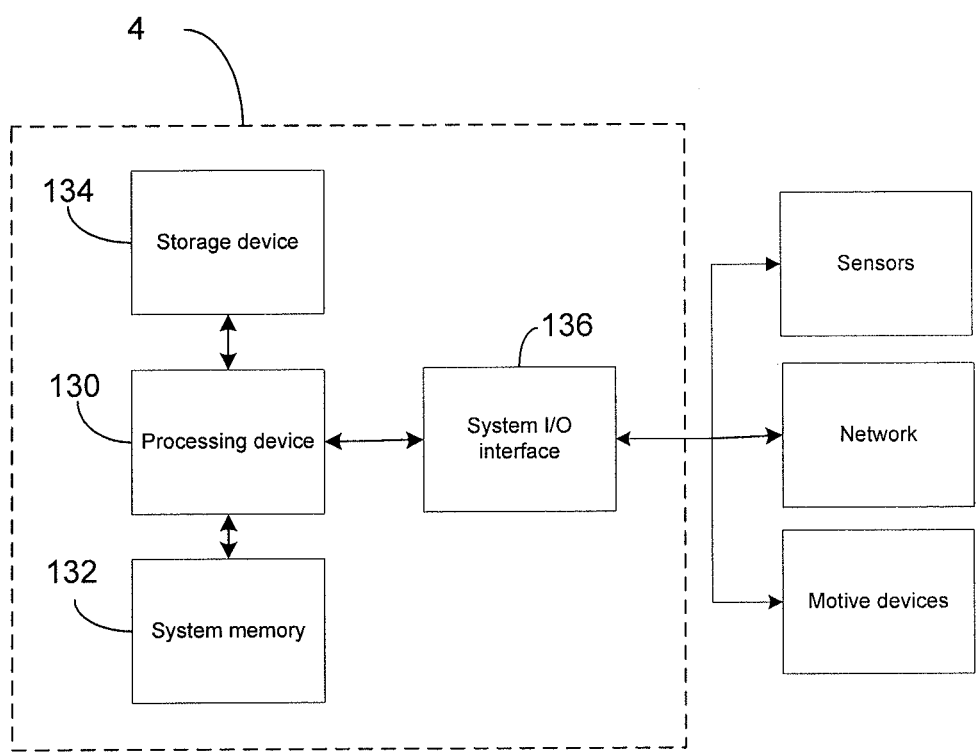
FIG. 11 is a schematic diagram illustrating components of an exemplary controller that can be used to implement the controller in accordance with the present invention.

FIG. 11 illustrates an exemplary temporal controller 4 that may reside within the robot 2. The temporal controller 4 includes is a processing device 130, such as a central processing unit (CPU), and system memory 132, such as random access memory (RAM) as is conventional. The temporal controller 4 also includes a non-volatile storage device 134, such as flash RAM, EPROM, PROM, disk drive, etc. that stores application code executable by the processing device 130. A system interface 136 provides the processing device 130 access to external hardware, such as sensors, motors controllers, networked processors and data storage, etc.

In operation, the processing device 130 retrieves instructions from the storage device 134 and, in conjunction with the system memory 132 and system interface 136, executes the instructions to control the robot 130 in accordance with the control functions described herein.

It is further envisioned that the above described device and method may be distributed across multiple processing and storage sub-systems on multiple robots, each working part of the solution. For example, a laser range finding sub-system on robot A may perform short-range, high-resolution sensor-data portion of loop 50 and short-range path planning portion of loop 90, a radar system on robot B may perform adverse-weather, long-range, sensor-data portion of loop 50 and long-range path planning portion of loop 90, a robotic arm also on robot A may combine multiple joint angle and torque sensor-data portion of loop 50 and object reaching and grasping portion of loop 90, and so on, each networked together to form a distributed, cooperative robot control system.

The actual code for performing the functions described herein can be readily programmed by a person having ordinary skill in the art of computer programming in any of a number of conventional programming languages based on the disclosure herein. Consequently, further detail as to the particular code itself has been omitted for sake of brevity.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any non-transitory medium that can contain (e.g., store) the program for use by or in connection with the instruction execution system, apparatus, or device. The computer-usable or computer-readable medium may be, for example but not limited to, non-transitory mediums including an electronic, magnetic, optical, electromagnetic, infrared, or semiconductor system, apparatus or device. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A temporal robot controller, comprising:
 a sensor module for receiving data corresponding to a location of at least one object in a robot environment, the robot environment corresponding to an occupancy grid with which the location of the at least one object is associated;
 a storage module operatively coupled to said sensor module, said storage module configured to store at least one of data processed from data received by the sensor module or a priori data;
 a temporal control module operatively coupled to said storage module, the temporal control module configured to temporally estimate a plurality of alternative future locations in the occupancy grid of the at least one object based on data retrieved from the storage module; and
 a temporal simulation module operatively coupled to said storage module and said temporal control module, the temporal simulation module configured to use the data stored by the storage module and the temporally estimated alternative future locations in the occupancy grid to temporally simulate multiple robot control hypotheses for future robot state planning,
 wherein iterating of the temporal simulation of the multiple robot control hypotheses by the temporal simulation module is performed asynchronously with respect to iterating of the temporal estimation of alternative future locations in the occupancy grid of the at least one object by the temporal control module and wherein the temporal simulation module is configured to predict actions of the at least one object based on predicted reactions of the at least one object to the state of the robot.

2. The controller according to claim 1, wherein the temporal simulation module is configured to time-propagate locations in the occupancy grid of the at least one object based on the received data corresponding to spatial locations, a priori map data, and a location of the robot in a common robot-centric representation.

3. The controller according to claim 1, further comprising a track file module operatively coupled between the sensor module and the temporal control module, the track file module configured to analyze data received by the sensor module and associate the data into tracks produced by the at least one object.

4. A temporal robot controller, comprising:
a sensor module for receiving data corresponding to a state of at least one object in a robot environment;
a storage module operatively coupled to said sensor module, said storage module configured to store at least one of data processed from data received by the sensor module or a priori data;
a temporal control module operatively coupled to said storage module, the temporal control module configured to temporally estimate a plurality of alternative future states of the at least one object based on data retrieved from the storage module;
a temporal simulation module operatively coupled to said storage module and said temporal control module, the temporal simulation module configured to use the data stored by the storage module and the temporally estimated alternative future states to temporally simulate multiple robot control hypotheses for future robot state planning; and
a track file module operatively coupled between the sensor module and the temporal control module, the track file module configured to analyze data received by the sensor module and associate the data into tracks produced by the at least one object
wherein iterating of the temporal simulation of the multiple robot control hypotheses by the temporal simulation module is performed asynchronously with respect to iterating of the temporal estimation of alternative future states of the at least one object by the temporal control module, and
wherein the temporal simulation module is configured to further use the tracks and predicted locations of the at least one object to simulate actions taken by the at least one object in response to robot actions corresponding to the simulated robot control hypotheses.

5. The controller according to claim 4, wherein each track includes data corresponding to at least one of position, velocity, acceleration or heading.

6. The controller according to claim 4, wherein the temporal control module is configured to use the tracks to predict future locations of the at least one object.

7. The controller according to claim 4, further comprising a storage and maintenance module operatively coupled to the track file module, the storage and maintenance module configured to delete tracks based on expected or probable trajectory and motion control.

8. The controller according to claim 4, further comprising a scoring module operatively coupled to the temporal control module, the scoring module configured to provide a ranking indicative of a likelihood that the at least one object will occupy each predicted locations.

9. The controller according to claim 8, wherein the scoring module is further configured to provide a ranking indicative of a likelihood that the at least one object will follow a path through two or more predicted locations.

10. The controller according to claim 8, further comprising a memory, wherein the ranking is stored in the memory and associated with each predicted location.

11. The controller according to claim 4, wherein the temporal simulation module is configured to predict actions of the at least one object based on the state of the robot.

12. The controller according to claim 11, further comprising a scoring module operatively coupled to the temporal simulation module, the scoring module configured to provide a ranking indicative of a likelihood that the at least one object will act as predicted.

13. The controller according to claim 4, wherein the temporal simulation module is configured to simulate the multiple robot motion hypotheses from a robot-centric point of view.

14. The controller according to claim 4, wherein the temporal control module includes a Kalman filter, the temporal control module configured to use the Kalman filter to predict future locations of the at least one object.

15. The controller according to claim 4, further comprising a storage device for storing the predicted future locations.

16. The controller according to claim 4, wherein the temporal simulation module is configured to use a behavior model to generate multiple action hypotheses for the robot.

17. The controller according to claim 4, wherein the temporal control module is configured to operate in a sensor-centric reference frame.

18. A method for simulating multiple robot control hypotheses for robot path planning in a controller that includes a temporal control module and a temporal simulation module, the method comprising:
receiving data corresponding to a state of at least one object in a robot environment;
storing at least one of data processed from the received data or a priori data;
using the temporal control module of the controller to temporally estimate a plurality of alternative future states of the at least one object based on the stored data;
using the temporal simulation module of the controller to temporally simulate multiple robot control hypotheses for future robot state planning, said temporal simulation based on the estimated alternative future states of the at least one object and the stored data;
analyzing received data and associating the data into tracks produced by the at least one object; and
using the tracks and predicted locations of the at least one object to simulate actions taken by the at least one object in response to robot actions corresponding to the simulated robot control hypotheses,
wherein iterating of the temporal simulation of the multiple robot control hypotheses by the temporal simulation module of the controller is performed asynchronously with respect to iterating of the temporal estimation of alternative future states of the at least one object by the temporal control module of the controller.

19. The method according to claim 18, further comprising time-propagating locations of the at least one object based on the received data corresponding to spatial locations, a priori map data, and a location of the robot in a common robot-centric representation.

20. The method according to claim 18, wherein each track includes data corresponding to at least one of position, velocity, acceleration or heading.

21. The method according to claim 18, further comprising using the tracks to predict future locations of the at least one object.

22. The method according to claim 18, further comprising deleting tracks based on expected or probable trajectory and motion control.

23. The method according to claim 18, further comprising providing a ranking indicative of a likelihood that the at least one object will occupy each predicted locations.

24. The method according to claim 23, further comprising providing a ranking indicative of a likelihood that the at least one object will follow a path through two or more predicted locations.

25. The method according to claim 18, further comprising predicting actions of the at least one object based on the state of the robot.

26. The method according to claim 25, further comprising providing a ranking indicative of a likelihood that the at least one object will act as predicted.

27. The method according to claim 18, wherein simulating multiple robot motion hypotheses includes simulating the multiple robot motion hypotheses from a robot-centric point of view.

28. The method according to claim 18, further comprising using a behavior model to generate multiple action hypotheses for the robot.

29. The controller according to claim 1, wherein the temporal simulation module is configured to simulate the multiple robot motion hypotheses from a robot-centric coordinate system.

* * * * *